Figure 1:
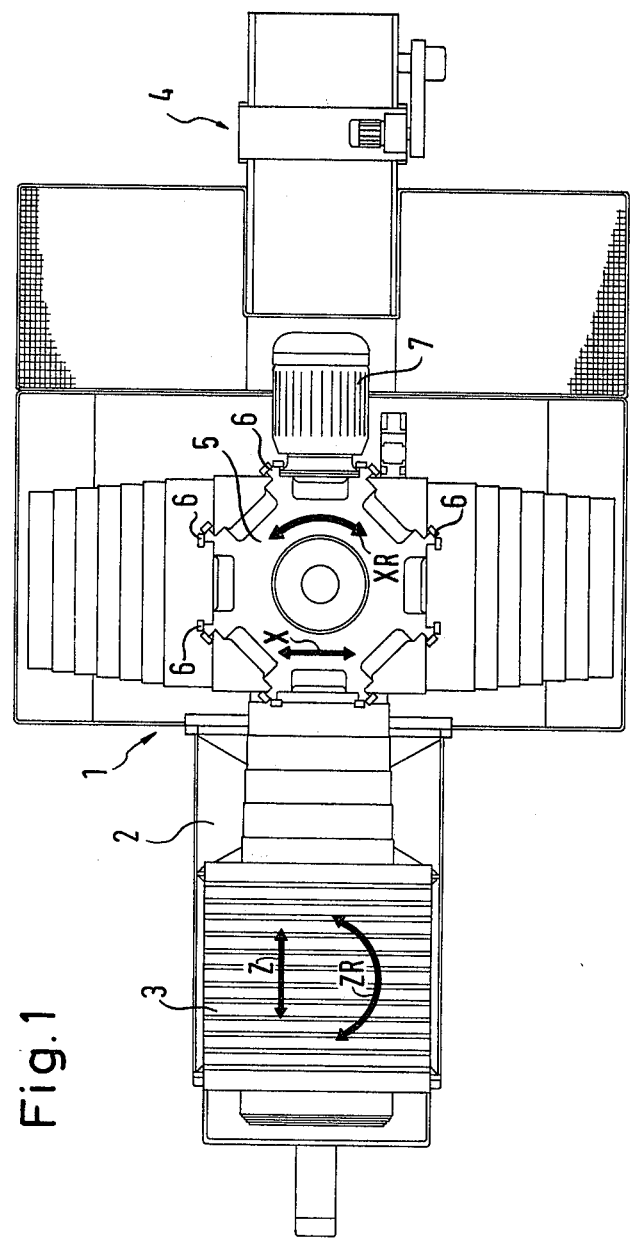

United States Patent [19]

Kölblin et al.

[11] 4,429,443
[45] Feb. 7, 1984

[54] MACHINE TOOL

[76] Inventors: Rolf Kölblin, Martin-Luther-Str. 12, Mosbach-Neckarelz; Wolfgang Keller, Flurstrasse 16, Mosbach-Diedesheim; Erich Wittmann, Gördelerstr. 136, 7100 Heilbronn, all of Fed. Rep. of Germany

[21] Appl. No.: 397,397

[22] Filed: Jul. 12, 1982

Related U.S. Application Data

[62] Division of Ser. No. 132,441, Mar. 21, 1980, abandoned.

[30] Foreign Application Priority Data

Aug. 24, 1979 [DE] Fed. Rep. of Germany ....... 2934395
Dec. 18, 1979 [DE] Fed. Rep. of Germany ....... 2950934

[51] Int. Cl.³ ............................................. B23B 39/20
[52] U.S. Cl. ..................................... 29/26 A; 29/39; 29/568
[58] Field of Search ............... 29/568, 26 A, 564, 563, 29/35.5, 36, 39, 40; 408/35; 74/813 R, 814

[56] References Cited

U.S. PATENT DOCUMENTS

| | | | |
|---|---|---|---|
| 3,355,797 | 12/1967 | Lohneis | 29/568 |
| 3,443,309 | 5/1969 | Huller et al. | 29/568 |
| 3,979,819 | 9/1976 | Nomura | 29/568 |
| 4,051,583 | 10/1977 | Kato | 29/568 X |
| 4,304,040 | 12/1981 | Staiger et al. | 29/568 |

FOREIGN PATENT DOCUMENTS

| | | | |
|---|---|---|---|
| 1813114 | 3/1970 | Fed. Rep. of Germany | 29/568 |
| 1552326 | 5/1972 | Fed. Rep. of Germany | 29/568 |
| 2103741 | 8/1972 | Fed. Rep. of Germany | 29/568 |
| 2429330 | 1/1976 | Fed. Rep. of Germany | 29/568 |
| 56-119347 | 9/1981 | Japan | 29/568 |
| 1015667 | 1/1966 | United Kingdom | 29/35.5 |
| 1263911 | 2/1972 | United Kingdom | 29/568 |
| 1352681 | 5/1974 | United Kingdom | 29/40 |
| 1486524 | 9/1977 | United Kingdom | 29/26 A |
| 1538409 | 1/1979 | United Kingdom | 29/26 A |

*Primary Examiner*—William R. Briggs
*Attorney, Agent, or Firm*—Townsend & Townsend

[57] ABSTRACT

The specification is directed to a method of operating a machine tool which enables a machining center, a transfer line or a flexible manufacturing system to be rapidly converted from the manufacture of one work piece to the manufacture of another workpiece. This is achieved by mounting all the tools associated with one series of machining steps on a common carrier unit and adapting the carrier unit so that it can be placed quickly in position on the machine tool and automatically centered in a variety of positions so that each of the individual tools can be brought into a desired machining relationship with the workpiece. The tools can comprise both stationary and driven tools and the machine tool is adapted to allow relative movement between the workpiece and the individual tools so as to carry out the desired machining steps. The tools can be preadjusted in their mounts before the carrier unit is placed on the machine tool and are to be stored already mounted on the carrier units to avoid tool losses when not in use. During machinery the tools preferably remain in the mounts but in one embodiment tools can be withdrawn from the mounts and transferred to a machining head. The carrier units are preferably of bell-like form and located on machine tools by means of a pair of mating Hirth rings.

15 Claims, 5 Drawing Figures

MACHINE TOOL

This is a division of application Ser. No. 132,441, filed Mar. 21, 1980, now abandoned.

The invention relates to a method of operating a machine tool for machining workpieces and to an apparatus for carrying out this method.

The invention particularly relates to a method of operating a machine tool for machining workpieces in which the machine tool, which can in particular be a machine tool incorporated in a transfer line or a flexible manufacturing system, is equippable with a plurality of different tools. In arrangements of this kind the various tools are brought one after the other from a waiting position to a working position in accordance with a predeterminable program, and after use are transferred once more to a waiting position.

It is customary in many areas of manufacturing technology to use such transfer lines and flexible manufacturing systems in order to manufacture particular types of workpieces in larger numbers. Transfer lines are as a rule equipped with several special and single purpose machines and represent a large capital investment. The transfer line is in general aimed at manufacturing only one type of workpiece and in general conversion of the transfer line to the manufacture of other workpieces can only be achieved with great difficulty and effort. The time involved in effecting such a conversion is considerable.

For these reasons there is increasing use of so-called flexible manufacturing systems which, in combination with a workpiece forwarding installation, embrace various machine tools such as multi-spindle boring machines with exchangeable multi-spindle heads, milling machines and machining centers with automatic tool change.

Such flexible manufacturing systems make it possible to convert from the manufacture of one product to another so as for example to carry out the manufacture of an initial series or pilot series, a manufacturing run and subsequently service parts. However even in a flexible manufacturing system a conversion of this kind is still associated with long down times of the entire system and is thus uneconomical.

The conversion, which is associated with a stoppage of the entire manufacturing system is above all very time consuming because the individual tools, multi-spindle heads or cassettes in the machine tools must each be accurately adjusted. Moreover problems exist in practice in storing the multiplicity of tools which need to be exchanged when converting a larger manufacturing system. The same problems occur when converting a transfer line, to the extent that this is at all suitable for conversion. Furthermore it is frequently necessary to store the tools for long periods of time which makes the situation even more problematic. It is in particular difficult to prevent the tools from becoming damaged or being taken for other purposes so that faults arising because of tool confusions and the like cannot be precluded with certainty on the next occasion when the tools are used.

Accordingly the invention is essentially based on the problem of providing a method of operating a machine tool of the kind which is equipable with a plurality of different tools so that the machine tool can be rapidly converted to the manufacture of different products or workpieces in a practical and simple manner without problem and with little trouble or expense.

In accordance with the invention this problem is solved by a method of operating a machine tool for machining workpieces which is equippable with a plurality of different tools, in particular a machine tool incorporated in a transfer line or in a flexible manufacturing system in which the various tools are brought, one after the other, from a waiting position to a working position in accordance with a predeterminable program and after use are transferred once more to a waiting position, characterized in that all the tools associated with at least one predeterminable machining sequence of the machine are mounted, at least in their waiting positions, in a carrier unit movable in accordance with a cycle and that on carrying out a change in workpiece machining the carrier unit is separated from the drive for its cycle, is removed together with the tools mounted thereon and is replaced by a new carrier unit equipped with other tools corresponding to the workpiece that is then to be machined.

The basic thought underlying the invention is thus that the tools necessary for machining a specific workpiece are collected together and mounted in a separate carrier unit removable from the respective associated drive device so that only the carrier unit needs to be exchanged in the event of a conversion of the machine tool being necessary. After the placement of a new carrier unit, which can be already externally prepared in the necessary manner, the machine and thus the entire system can once more be set in operation with little delay. As the carrier unit, which is equipped for the manufacture of a specified workpiece or for carrying out a specified sequence of operations, can be stored as a unit until it is needed again any danger of tool confusion is precluded.

It is especially advantageous to have the tools ready adjusted in the carrier unit and, after connecting the carrier unit and the associated drive for its cycle, i.e. the drive needed to index the carrier unit to the positions required for effecting the manufacturing sequence, to bring the tools or tool cassettes into their machining positions without separating them from the carrier unit. The tools which are to be driven can then be connected with a tool drive of the machine tool for the duration of the associated machining step.

As in this manner the time consuming adjustment work can be carried out away from the manufacturing system and at any desired times, and moreover because tool transfer and tool change procedures between the carrier unit and the machine tool are avoided the machine tool can be converted extremely rapidly. Furthermore the method of operation proceeds without problem.

If, in particular cases in which extremely high accuracies are required, it should be necessary to once more carry out a fine adjustment in the machine tool of the tools or cassettes which have already been adjusted in the carrier unit then this fine adjustment need only be carried out once because on interchanging the carrier unit no removal of the tools or loss of adjustment occurs and thus the fine adjustment is already present on the next occasion that this carrier unit is used.

Thus an extremely high degree of machine utilization is achieved by the measures in accordance with the invention even when the entire system has to be more frequently converted. As the preparation, and in particular the adjustment work, can be carried out externally, i.e. whilst the manufacturing system is in operation the personnel necessary for carrying out this work can also be used at an optimum.

It is particularly advantageous that the exchangeable carrier unit can be equipped, at least in part with stationary tools and that the relative movements necessary between the tool and the workpiece during workpiece machining with a stationary tool are generated by a workpiece drive in conjunction with a guided pivotal or sliding movement of this workpiece drive and/or a guided sliding movement of the machine connected to the carrier unit and that, on the transition from workpiece machining with stationary tools to workpiece machining by means of driven tools and vice versa the prevailing clamping of the workpiece remains unchanged. On equipping the carrier units with driven and/or stationary tools it is possible to select desired combinations and sequences because carrier units equipped as desired can be placed and positioned on the associated machine tools. It is then always ensured that a tool which is to be driven is coupled in the working position with the tool drive provided by the machine tool. However when a stationary tool is located in the machining position either the tool drive is not activated or measures are taken to ensure that a free space is provided in front of the coupling element of the drive from the machine tool. This free space then takes the place of the mating coupling element which is provided in respect of the driven tools and which, in the working position of these tools is able to mate with the retractable and extendible coupling element of the drive from the machine tool.

As a result the number of uses of the system in accordance with the invention is further increased so that this system can be adapted without difficulty to meet all the relevant problems which occur in practice.

An especially advantageous apparatus for carrying out the method in accordance with the invention is characterized in that the carrier unit for the tools is constructed as an exchangeable turret which can be placed on the associated machine tool and locked thereto, that the turret has a plurality of mounts for driven and/or stationary tools distributed around its periphery and is, on the one hand, connected with the drive for the cycle of the machine tool and is, on the other hand, exactly positioned relative to the machine tool via a centering unit.

By constructing the carrier unit in the form of a turret simple, easy to handle, carrier units are provided which are also capable of being stored without problem. The centering unit is effective both when the turret is being placed on the machine tool and also during the operation thereof and ensures that the turret can be mounted rapidly and without problem. The exact adjustment of the machining tools is thus ensured as soon as the turret has been fixed to the machine.

By the use of suitably constructed adaptors it is possible to lock in position in the turret mounts and to adjust available multi-spindle boring heads from different manufacturers and also tools and tool cassettes which for example have already been used in transfer lines. In this way workpieces which could previously only be manufactured on a transfer line can, for example, be manufactured in a flexible manufacturing system constructed in accordance with the invention. The transfer line can in such a case then be dismantled and the space gained used for another purpose.

The centering unit preferably comprises face-toothed index rings of which the one is fixed to a ring carrier seat of the machine tool and the other is fixed in the lower end region of the turret which is of essentially annular bell-like construction. This results in a particularly compact and constructionally simple arrangement which satisfies the highest accuracy requirements for the required centering.

The turret is connected via a pivot bearing both with a central lifting and clamping device and with a pivot drive for its cycle of movements about the pivot bearing. The lifting and clamping device is usefully fixedly connected to the inner ring of the pivot bearing and the pivot drive engages a toothed outer ring of the pivot bearing.

Not only is the construction simplified by virtue of the multiple functions which are associated for this construction with the individual devices and units but the operational reliability is also increased.

In accordance with one variant of an embodiment of the invention the lifting and clamping device is actuatable via a screw drive which is of self-locking construction and is arranged at the lower end of the central support. In this way both a high degree of accuracy of control of the movement of the central carrier and a simple and functionally more reliable construction can be ensured.

A further advantageous special feature of the invention is the facility to provide an oil feed in the form of a distributor unit at the turret end of the central support. This is also a consequence of the fact that the central drive unit is arranged beneath the turret and is connected via gearing to a coupling unit having an engaging device.

Although the turret can in principle be fixed relative to the machine in any desired manner, providing it is always centered, it is advantageous if the securing of the turret on the machine is effected via a quick connector. This quick connector can for example be of bayonet connector-like construction and ensures that the time required for exchanging a turret is further reduced.

The central drive unit which comprises an electric motor of constant rotational speed can have a relatively low rotational speed for example a speed of the order of 700 revolutions per minute as the speed required for the actual tool can be achieved via a gear mechanism provided in the associated cassette.

The engaging device which ensures the connection of the machine drive with the drive shaft of the cassette is, in accordance with one embodiment of the invention, axially reversible between a coupling and a decoupling position via a piston in cylinder arrangement. The engaging device is preferably of claw-like construction in which the individual claw elements are of knife-like form at their free ends and the cooperating elements at the cassette connection comprise mating rollers. I.e. rollers which fit between the individual claw elements and ensure, together with the knife-like claw ends, that a troublefree connection is of necessity achieved during the coupling procedure and independently of the relative position of the two elements that are to be coupled together.

Figure 2:
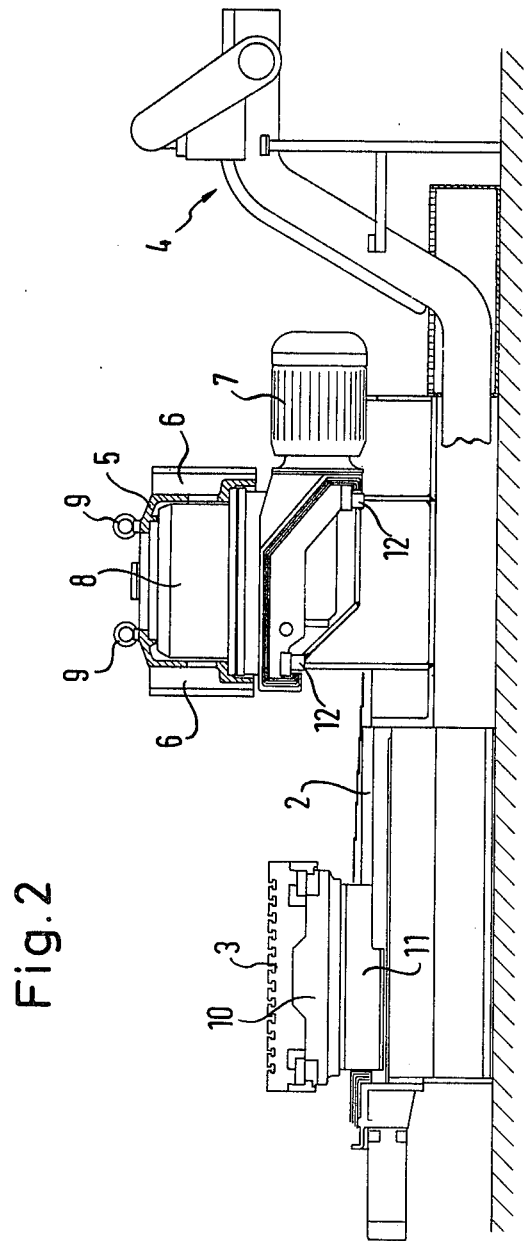
Figure 3:
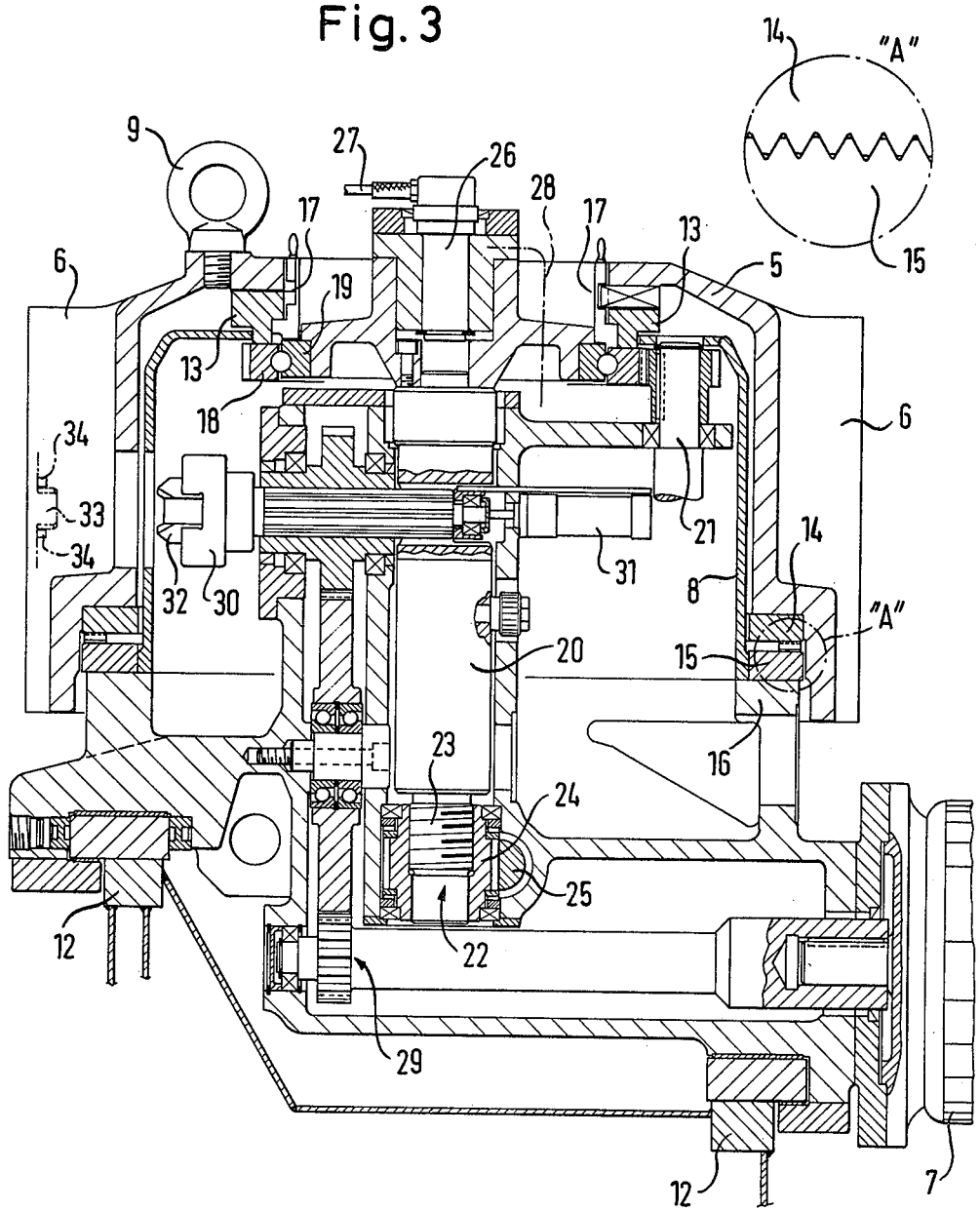
Figure 4:
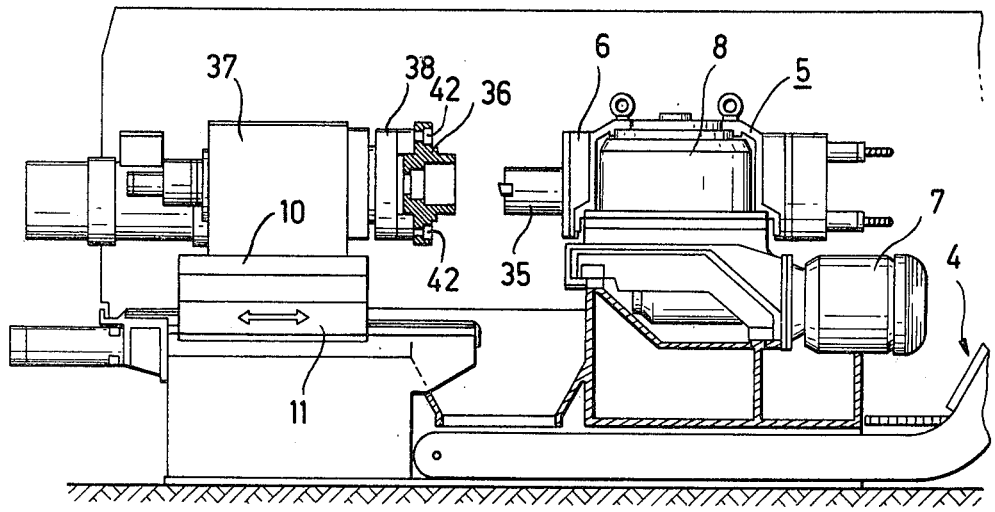
Figure 5:
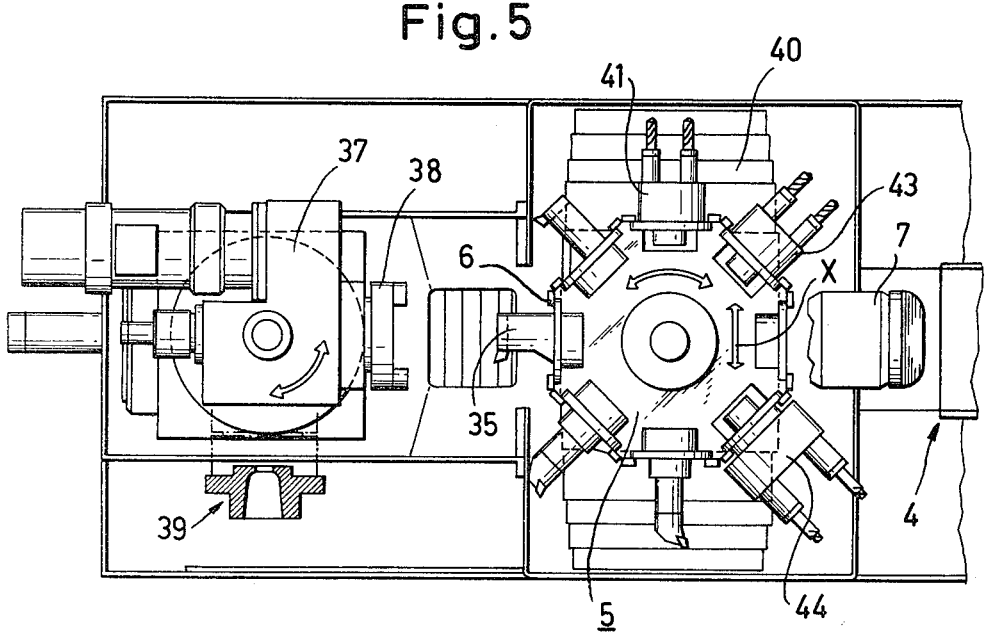

Embodiments of the invention will now be more clearly explained by way of example only and with reference to the accompanying drawings in which are shown:

FIG. 1 a schematic plan view of a machine tool constructed in accordance with the invention and having a workpiece supply track, FIG. 2 is a side view of the arrangement of FIG. 1, FIG. 3 a schematic sectional illustration of the machine tool of FIG. 1, FIG. 4 a schematic side view of a further machining station constructed and operated in accordance with the present invention, FIG. 5 a plan view of the station of FIG. 4.

As seen in FIG. 1 pallets 3 which serve to mount the respective workpieces are passed via a guide track 2 to a machine tool designated with the general reference numeral 1. A customary swarf transport device indicated by the general reference numeral 4 and having an associated coolant tank is additionally associated with the machine 1.

A workpiece fastened to the pallet 3 can be moved in the direction of the arrow Z and pivoted in accordance with the arrow ZR.

The machine tool 1 is provided with an exchangeable turret 5 which has several mounts 6 for tool cassettes distributed around its periphery. The individual tools or tool cassettes can be driven or stationary as required.

In the case of a driven tool the cassette drive is coupled with the central drive 7 of the machine tool when in the cassette position corresponding to the supply track 2. This will be later explained in detail. The turret 5, when in place in the machine tool, can execute the rotational movement designated by the arrow XR and the straight line movement corresponding to the arrow X which is necessary for milling procedures.

FIG. 2 shows how the machine tool is guided on transverse rails 12 for the purpose of making possible the movement in the direction of the arrow X.

A rotatable table 10 makes it possible to pivot the pallet 3 in accordance with the arrow ZR and a longitudinal slide 11 ensures the movement of the pallet 3 in the direction of the arrow Z.

The turret 5 which is provided with the cassette guides 6 has an annular bell-like form and is provided with carrying eyes 9 by means of which the turret can be placed on the machine tool and can once more be lifted away from the machine tool. A guide dome 8 is provided for the purpose of ensuring an initial centering of the turret 5 during mounting and removal thereof.

The construction of the machine tool as equipped with an exchangeable turret 5 will now be explained with reference to FIG. 3. The annular bell-like turret 5 is already equipped with the tools and the tool cassettes and indeed these cassettes are simultaneously adjusted before the turret is placed on the machine. The adjustment can for example take place with the aid of a stone plate or special adjustment devices (preadjustment apparatus).

The equipped turret 5 is lowered by means of a suitable lifting device over the guide dome 8 which brings about an initial centering of the turret so that it comes into engagement with an upper support ring 13. This ring 13 is connected via a supporting ball bearing 18, 19 with an axially adjustable central support 20 which is preferably in its raised position during the placement of the turret.

The turret is provided at its lower skirt-like part with a face-toothed ring 14 which comes into centering engagement, during the lowering of the turret by retraction of the central support 20, with a likewise face-toothed ring 15 which is fastened to a support ring 16 provided on the machine.

The tooth construction of the index rings 14 and 15 is preferably a Hirth tooth construction which ensures both exact centering and also exact indexing of the position of the carrier unit or turret. The tooth construction of the rings 14 and 15 can be seen in the detail illustration A.

The central support 20 is a component of a lifting and clamping device in which the lifting and lowering movement is achieved via screw drive 22 which is provided at the lower end of the central support 20. The screw drive 22 consists of a threaded part 23 provided on the central support, a rotatably journalled nut part 24 and a drive part 25 cooperating via gear teeth with this nut part. The turret 5 can be lifted upwardly, by means of this compact drive 22, by a sufficient amount that the teeth of the index rings 14 and 15 disengage so that the turret can be pivoted, i.e. indexed in the necessary manner and indeed in an exactly predeterminable manner. This pivoting takes place via a drive 21 which cooperates with the toothed outer ring 18 of the support bearing. The drive 21 thus forms the drive for the cycle of movements executed by the turret between the individual steps of the machining sequence which it is adapted to carry out.

After the turret has been centered it is uniquely locked in its position by means of a quick connector 17 which is constructed in the manner of a bayonet connector and which utilises a locking ring to effect the bayonet connection. The free space which is available at the turret end of the central support 20 is utilized to receive and oil distribution and circulating unit 26 which can be connected at the connection 27 with a flexible supply line preferably via a quick coupling. A line leading away from the oil distributor 27 is indicated at 28.

The drive unit 7 of the machine tool is located beneath the turret and is connected with an engagement device 30 via gearing indicated by the general reference numeral 29. The engagement device is movable between a decoupled position and a coupled position via a piston in cylinder arrangement 31. In the coupled position the engagement device 30 is in mechanically locked force transmitting engagement with the drive shaft 33 of a cassette arranged and adjusted in the mount 6. One advantage of this arrangement is that the rotational speeds necessary for the tools of the respective cassette are generated via a gear mechanism provided in the cassette. The speed of the central drive 7 is relatively low, for example approximately 700 revolutions per minute so that favourable thermal conditions prevail in the machine tool. If greater heat generation or temperature variation occurs in the cassette as a result of the higher speeds that are used this is not disturbing because the cassette is only used for a relatively short period and can cool down again after the position of the turret has been changed.

The engagement device 30 is of claw-like construction in which the individual claw elements 32 are of knife-like form at their free ends. The cooperating counter elements on the cassette comprise rotatably journalled rollers, in particular ball bearings which engage between the claw elements 33. In this way it is ensured that an exact coupling is necessarily achieved on advance of the engagement device 30 independently of the actual relative positions of the two parts which are to be coupled together.

It can be seen that the procedure of exchanging the turret 5 which is equipped with adjusted cassettes can take place without costly dismantling work because, for the purpose of exchanging the turret, it is only necessary to release the supply line to the oil distributor (if provided) via a quick release coupling and then, after opening of the quick release connection 17, the turret can be immediately lifted and replaced with a new turret which is equipped with cassettes and already adjusted but which is intended for the machining of another workpiece.

Referring now to FIG. 4 there can be seen a machine tool intended for turning and boring operations and which is once more provided with an exchangeable carrier unit or turret 5. The turret 5 has several mounts 6 for tools or tool cassettes such as 35, 41, 43, 44 distributed about its periphery. The tools or tool cassettes are in part rotating i.e. driven tools and in part stationary tools. A pivotable table 10 arranged on a longitudinal slide 11 is associated with the machine which carries the rapidly exchangeable turret 5. The pivotable table 10 carries a rotatable spindle 37 which is equipped with a drive and a chuck 38. The workpiece 36 which is presently locked in position and adjusted in the chuck 38 can be driven by the rotatable spindle and can be moved relative to the stationary tool 35 by means of the longitudinal slides and the pivotable table.

The plan view of FIG. 5 shows the loading and unloading station for the workpieces. In addition it can be seen that the turret 5 is equipped with several different tools or tool cassettes comprising, in part, rotating tools such as 41, 43, 44, i.e. tools which are to be driven in their working position and, in part, stationary tools such as 35.

The machine tool carrying the turret is displaceable in the direction of the arrow X via a plain slide and is moreover pivotable in the customary manner via a cycle drive so that the individual tools can reach the machining position facing the workpiece in sequence.

The advantageous manner of operation achievable by the invention becomes clear if one considers for example the machining steps which are to be carried out in sequence on the workpiece 36.

This workpiece 36 which is positioned and locked in the chuck 38 is first of all machined by means of fixed tools 35 and indeed the internal and external shapes are machined with stationary tools on the rotating workpiece.

The workpiece 36 is subsequently stopped and the flange apertures 42 are bored by means of a multi-spindle head 41 with the workpiece still clamped in the same position in the chuck. Finally, following the next switching or indexing movement of the turret, the core bores are provided with threads by means of a multi-spindle thread cutting head 43.

It can be seen from this example that the freedom in equipping the exchangeable carrier units which is brought about by the invention means that optimum machining sequences can be predetermined and that the essential advantage of an absolute minimum of conversion time is always present.

We claim:

1. A machine tool comprising:
   support means for a workpiece;
   a machine turret having a tool carrier unit with a plurality of spaced apart mounts for carrying a plurality of tools, including at least one driven tool, associated with a machining sequence, said tool carrier unit being indexable to a plurality of stations to bring each of said plurality of mounts in turn to a working station, said machine turret further comprising:
   a base unit with a first face-toothed index ring;
   a second face-toothed index ring on said tool carrier unit, said tool carrier unit being engageable with said base unit and said second face-toothed index ring being complementary to and engageable with said first face-toothed index ring;
   clamping means movable relative to said base unit between a first position in which said first and second face-toothed index rings are firmly clamped one against the other and a second position in which said first and second face-toothed index rings are free of one another;
   bearing means between said tool carrier unit and said base unit to permit relative rotary indexing therebetween when said carrier unit is in said second position;
   a tool drive within said base unit and coupling means for releasably coupling said tool drive to a driven tool positioned at said working station; drive means comprising a pinion gear journalled in said base unit and an annular ring gear attached to said tool carrier unit for rotating said tool carrier unit relative to said base unit when in said second position to index said tool carrier unit to each of said plurality of stations in accordance with said machining sequence;
   quick release connections means for releasably attaching said carrier unit to said clamping means thereby enabling said carrier unit together with any tools mounted thereon to be rapidly exchanged; and
   means for producing relative movement between said support means and said machine turret to effect machining of a workpiece supported by said support means; wherein said bearing means comprises a ball bearing having first and second races, wherein said clamping means comprises a central support column axially movable relative to said base unit and having an upper end carrying one of said first and second races, wherein the other of said first and second races is connected to said tool carrier unit via said quick release connection means, and wherein said ring gear is provided on the race connected to said tool carrier unit.

2. A machine tool in accordance with claim 1, wherein said central support column is actuatable by a screw thread drive at a lower end thereof.

3. A machine tool in accordance with claim 2, wherein said screw thread drive comprises a threaded part provided on said central support column, a cooperating nut part rotatably journalled within said base unit and a drive part cooperating with said nut part via gear teeth.

4. A machine tool in accordance with claim 1, wherein said quick release connection means comprises a bayonet connection.

5. A machine tool in accordance with claim 1, wherein said tool carrier unit is of substantially bell-like form and said base unit has a substantially cylindrical outer dome formed for precentering to facilitate engagement of said tool carrier unit over said base unit.

6. A machine tool in accordance with claim 1, further comprising a drive unit for driving said at least one driven tool, said drive unit being mounted beneath said machine turret and being connected via gearing to a coupling unit having a releasable drive engaging device for releasably connecting said drive unit to said at least one driven tool when positioned said working station.

7. A machine tool in accordance with claim 6, wherein said drive engaging device is axially reversible via a piston-in-cylinder arrangement between a coupling position and a decoupling position.

8. A machine tool according to claim 7, wherein said central support column is mounted centrally within said base unit for axial movement relating thereto and wherein said drive engaging device extends with clearance through said central support column.

9. A machine tool in accordance with claim 7, wherein said drive engaging device includes claw elements having free ends of knife-like form, said claw elements being adapted to cooperate with mating rollers provided on tool cassettes mounted on said mounts.

10. A machine tool in accordance with claim 1, wherein said first face-toothed ring is arranged at the base end of said base unit.

11. A machine tool in accordance with claim 1, wherein said tool carrier unit is provided with lifting rings.

12. A machine tool in accordance with claim 1, wherein an oil circulating and distribution unit is provided at the upper end of said central support column.

13. A machine tool in accordance with claim 1, wherein said support means for a workpiece comprises chuck means rotatable about a first axis, a pivotable table carrying said chuck means and a drive therefor and a longitudinal slide carrying said pivotable table for movement towards and away from said machine turret.

14. A machine tool in accordance with claim 13, wherein said machine turret is movable in a direction transverse to said longitudinal slide.

15. A machine tool comprising:
support means for a workpiece;
a machine turret having a tool carrier unit with a plurality of spaced apart mounts for carrying a plurality of tools, including at least one driven tool, associated with a machining sequence, said tool carrier unit being indexable to a plurality of stations to being each of said plurality of mounts in turn to a working station, said machine turret further comprising:
a base unit with a first face-toothed index ring;
a second face-toothed index ring on said tool carrier unit, said tool carrier unit being engageable with said base unit and said second face-toothed index ring being complementary to and engageable with said first face-toothed index ring;
clamping means movable relative to said base unit and operative to move said carrier unit relative to said base unit between a first position in which said first and second face-toothed index rings are firmly clamped one against the other and a second position in which said first and second face-toothed index rings are free of one another;
bearing means between said tool carrier unit and said base unit to permit relative rotary indexing therebetween when said carrier unit is in said second position;
a tool drive within said base unit and coupling means for releasably coupling said tool drive to a driven tool positioned at said working station; drive means comprising a pinion gear journalled in said base unit and an annular ring gear attached to said tool carrier unit for rotating said tool carrier unit relative to said base unit when in said second position to index said tool carrier unit to each of said plurality of stations in accordance with said machining sequence;
quick release connection means for releasably attaching said carrier unit to said clamping means thereby enabling said carrier unit together with any tools mounted thereon to be rapidly exchanged; and
means for producing relative movement between said support means and said machine turret to effect machining of a workpiece supported by said support means; wherein said bearing means comprises a ball bearing having first and second races, wherein said clamping means comprises a central support column axially movable relative to said base unit and having an upper end carrying one of said first and second races and wherein the other of said first and second races is connected to said tool carrier unit via said quick release connection means.

* * * * *